United States Patent [19]

Beiser

[11] 4,290,675

[45] Sep. 22, 1981

[54] ANAGLYPH STEREOSCOPY

[76] Inventor: Leo Beiser, 151-77 28th Ave., Flushing, N.Y. 11354

[21] Appl. No.: 93,979

[22] Filed: Nov. 14, 1979

Related U.S. Application Data

[63] Continuation-in-part of Ser. No. 966,054, Dec. 4, 1978, Pat. No. 4,222,653.

[51] Int. Cl.³ .......................... G03B 35/00; G03B 9/02
[52] U.S. Cl. ..................................... 354/112; 354/270
[58] Field of Search ....................... 354/112, 246, 270; 355/67 S

[56] References Cited

U.S. PATENT DOCUMENTS

| | | | |
|---|---|---|---|
| 683,573 | 10/1901 | Pasquarelli | 355/67 S X |
| 3,365,262 | 1/1968 | Newcomer | 354/270 X |
| 3,712,199 | 1/1973 | Songer | 354/112 |
| 3,967,895 | 7/1976 | Crook | 355/67 S X |

Primary Examiner—Donald A. Griffin
Attorney, Agent, or Firm—Darby & Darby

[57] ABSTRACT

An anaglyph stereoscopic system is disclosed wherein left and right images are encoded as complementary color fringes in the defocus regions such that the image, when viewed through appropriately filtered glasses, is perceived as a three-dimensional colored image but, when viewed without glasses, appears essentially as a normal two-dimensional colored image. In order to enhance the three-dimensional effect and the compatibility of the two-dimensional image, a special iris is employed for controlling the amount of light passing through the taking lenses of the imaging system. Essentially, the iris restricts the amount of light in the vertical direction only, thereby retaining full left-right separation as the amount of light passing through the filter is restricted by the iris.

The taking filters of the imaging system are selected so that after normal processing, the image colorimetry is not disturbed. This requires that the spectral characteristics of the photoreceptors maintain the same ratios with the filters as without.

The glasses through which the three-dimensional image is viewed includes complementary color filtering means for the left and right lenses of approximately balanced luminosity characteristics. Viewer comfort is materially enhanced without substantial degradation of the stereoscopic image by providing for a limited amount of cross-talk between the respective lenses.

17 Claims, 14 Drawing Figures

ANAGLYPH STEREOSCOPY

This is a continuation-in-part of U.S. patent application Ser. No. 996,054, filed Dec. 4, 1978, and entitled "Visual Effects Optical Relay" now U.S. Pat. No. 4,222,653 issued Sept. 16, 1980.

This invention relates to anaglyph stereoscopy and, in particular, to a three-dimensional imaging system in which left and right images are encoded by complementary color fringes in the defocus region.

Anaglyph stereoscopy is a well-known process in which left and right images are color encoded by respective complementary color filters (e.g. cyan and red) for viewing through corresponding glasses to separate the images as required for a three-dimensional effect.

U.S. Pat. No. 3,712,199 of Songer, Jr. discloses an anaglyph stereoscopic imaging system in which a "compatible" two-dimensional picture is taken through a single lens. The photographic print is "compatible" in the sense that when it is viewed without filtered glasses, the image appears to be a normal two-dimensional image; however, when viewed through appropriately filtered glasses, a three-dimensional image is seen.

Essentially, in the Songer system, three-dimensional information is derived from defocus components of the objects to be photographed. Thus, if an object is sharply focused on the image plane of the camera, an object closer to the camera would normally be focused beyond the image plane. An object further from the camera would be sharply focused in front of the image plane. It can be shown that closer objects traverse the image plane with a defocus blur in the same sense as through the lens whereas further objects traverse the image plane with a defocus blur in the opposite sense. If complementary color filters cover horizontally opposite sides of the lens, a focused image will appear in normal full color, while defocused objects will have left and right borders encoded as described above. For example, if cyan and red filters are used, objects closer to the camera may have a red fringe on the right side and a cyan fringe on the left side. Objects further from the camera would have a red fringe on the left side and a cyan fringe on the right side. When viewed without the aid of glasses, these fringes do not materially affect the normal two-dimensional aspect of the picture; however, when viewed through corresponding filters, the left and right enclosed images are combined to create a three-dimensional perception of the scene.

For a more complete understanding of single lens anaglyph stereoscopy, reference is made to the aforesaid Songer patent which is hereby incorporated by reference into this specification.

Songer suggests the use of a conventional iris near the aperture stop plane to control the amount of light from object space by varying the periphery of the aperture stop. Conventionally, camera irises are round and the aperture is varied equally in two dimensions (i.e., both vertically and horizontally). In the Songer system, the horizontal dimension of the iris determines the amount of useful fore and aft defocus and, hence, image separation. Accordingly, with a standard round iris or diaphragm, as the size of the aperture is decreased, the three-dimensional effect is decreased due to the reduction of horizontal disparity.

Furthermore, in the Songer system, since the separation of the images depends on the extent of the color fringing, it has been considered desirable to enhance separation by minimizing cross talk between the filters in the taking lenses and in the viewing glasses. However, the more prominent the fringing effect, the less acceptable (i.e. compatible) the two-dimensional image. Therefore, there is a trade-off between separation and compatibility and, for practical purposes, it is important that the fringing effect be optimized with regard to image separation and compatibility. This involves the filters in the taking system and in the lenses of the glasses through which the three-dimensional image is viewed. Additionally, it is highly desirable to maintain the color balance (colorimetry) of the existing system (i.e. without the filters) so that balance is independent of the selected color filtration. That is, the radiant exposure of the photoreceptors when the filters are in place should have the same color balance as would exist during normal (i.e. non-stereoscopic) use when the filters are not in place. This avoids the need for introducing correction by way of further filtration or electronic color correction while providing the user with the latitude to which he is accustomed.

OBJECTS OF THE INVENTION

A principal object of the invention is to overcome or at least minimize to the extent possible the above-mentioned deficiencies of the Songer system.

Another object of the invention is to provide an iris construction for use with the taking lens of a single lens anaglyph stereoscopic system wherein horizontal disparity is substantially unaffected by the size of the iris opening.

Still another object of the invention is to provide an iris construction for use in a single lens anaglyph stereoscopic system wherein vertical resolution is improved and aberration in the vertical direction is reduced.

A further object of the invention is to provide an iris construction which can be rotated about the optical axis of a camera employed in a single lens anaglyph stereoscopic taking system so that the camera can be rotated without loosing horizontal disparity and, consequently, stereoscopy.

A still further object of the invention is to provide a color filter configuration within the iris region of the taking lens of a single lens anaglyph stereoscopic system which optimizes stereo image encoding and image compatibility when viewing without glasses.

Still a further object of the invention is to define the optimum transmittance characteristics of the lenses of glasses to be used in viewing images produced by a single lens anaglyph stereoscopic system with regard to viewing comfort and image separation.

SUMMARY OF THE INVENTION

An iris construction for use in restricting the amount of light passing through the aperture stop of a single lens anaglyph stereoscopic system comprises a pair of blades which are movable with respect to each other and which define an iris which is variable essentially only in its vertical dimension so that image disparity is not materially affected by the size of the iris opening.

The filters in the taking system are balanced radiometrically with respect to the spectral sensitivity characteristics of the photoreceptors (color film or television camera) so that the radiometric balance with the filters in place does not differ substantially from the radiometric balance during normal use, i.e. in non-stereoscopic applications.

The glasses through which the color encoded images are viewed comprise complementary colored lenses having approximately balanced luminosity characteristics. A preselected amount of cross-talk, preferably between 5% and 15%, exists between the lenses. It has been found that this moderate amount of cross-talk greatly enhances viewer comfort while at the same time maintaining adequate image disparity for highly acceptable stereoscopy.

THE DRAWINGS

DETAILED DESCRIPTION

In describing the preferred embodiments of the invention, reference is made to a photographic camera for taking still or motion pictures. However, single lens anaglyph stereoscopy is applicable to other imaging systems, such as television.

Figure 1:
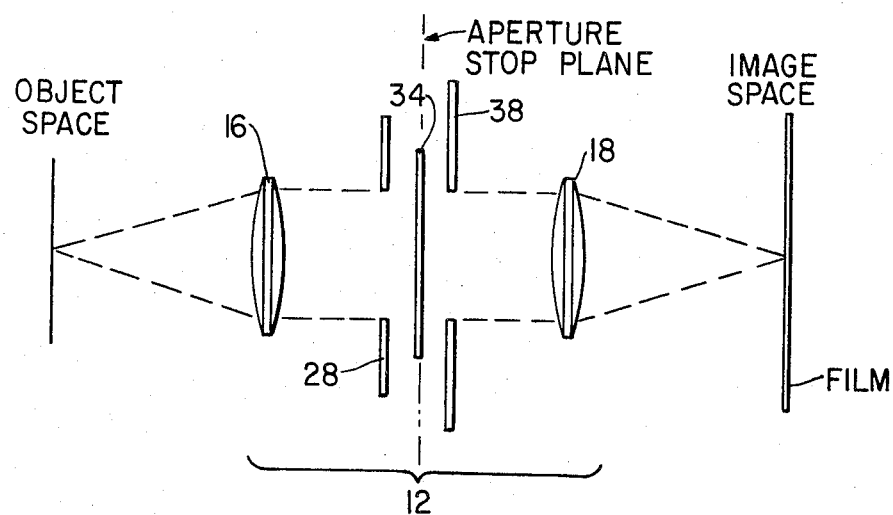
FIG. 1 shows diagrammatically the optics of a camera intended to be used in a typical single lens anaglyph stereoscopic system.

The basic optical system of the camera is shown in FIG. 1. The camera may include a conventional taking lens 12 which can be represented schematically by front and rear lenses 16 and 18, respectively. The taking lens may be a standard finite conjugate lens comprising a plurality of front elements 16 and rear elements 18 with an intermediate space in which exists generally collimated light rays emanating from the object to be photographed. There is a plane in this area generally referred to as the aperture stop plane (or the iris plane) which limits the size of the actual cone of energy which is accepted from object space and transferred to the image plane (within the camera body). As explained in the Songer patent, all light emanating from any point in object space and accepted by the lens will fill the aperture stop, and it is at (or near) the aperture stop plane that the iris and requisite color filters for anaglyph stereoscopy must be physically located.

The light flux appearing at the aperture stop plane is transferred by the lens 18 to a region which encompasses the surface of the photosensitive material (the photoreceptors) within the camera used to record the image.

A conventional round iris 28 limits the amount of light traversing the aperture stop plane. This iris need not be used (i.e. may remain fully open) when the vertically actuated iris of the invention is present or it may be replaced by a vertical iris configuration in accordance with the invention. The color filters 34 are also positioned near the aperture stop plane. The special iris in accordance with the invention is shown at 38 and also serves to limit the amount of light traversing the lens system. As described in detail below with reference to FIGS. 2 and 3, the vertical iris 38 essentially restricts light in the vertical direction only permitting full horizontal disparity to sustain image separation as the iris opening is restricted.

Normally, iris openings are round and the iris is closed equally in both dimensions (horizontally and vertically) by a circular array of leaves to adjust the amount of light traversing the lens system. This provides generally equal image defocus characteristics (horizontally and vertically) in normal imaging systems. In single anaglyph stereoscopy, however, only the horizontal aperture width determines the amount of useful defocus and, hence, the resulting stereoscopic image disparity. Therefore, standard two-dimensional irises tend to diminish the stereoscopic effect as the iris opening is decreased to control the light throughput.

In accordance with the invention, the iris comprises an opening 40 through which the light for the lens system passes. The iris opening may be reduced by a pair of upper and lower plates 42 and 44, respectively, which function to restrict essentially only the vertical dimension of the iris and not its horizontal subtense. With this construction, the horizontal aperture dimension may be selected to provide the horizontal disparity required for stereoscopic separation while the vertical dimension alone is varied to adjust the light throughput required for correct exposure at a given shutter speed. Horizontal disparity can be further reduced if desired by adjustment of the conventional round iris of the taking lens from its nominally wide open pre-set position or by a similar restriction of the horizontally filtered subtense.

Figure 2:
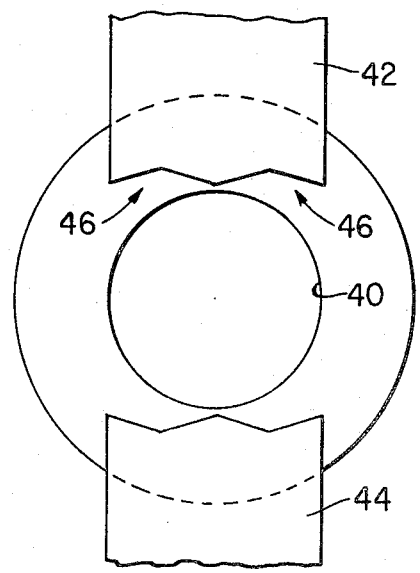
FIG. 2 shows diagrammatically a preferred embodiment of a one-dimensional iris according to the invention.

In the embodiment shown in FIG. 2, the opposing ends of the iris plates 42 and 44 include triangular cutout areas 46 so that the horizontal subtense of the iris is moderately diminished as the vertical subtense is reduced to its minimum dimension. This enables a minimum vertical dimension to be maintained so as to avoid well-known diffraction effects which cause a deterioration of resolution if the aperture is too narrow. At the same time, horizontal separation is maintained through the overlapping open areas 48 of the triangular cutout portions as the aperture size is reduced by the desired amount. The slopes and shapes of the triangular portions can be varied as needed to satisfy diffration requirements. For example, if it is necessary to maintain a one-millimeter vertical opening to satisfy diffraction requirements for adequate vertical resolution and the nominal aperture opening at T/4 is 256 mm$^2$ (effectively a 16×16 mm square aperture), reduction of the aperture opening to T/32 would require that the shaded portion 48 in FIG. 3 have an included area of four square millimeters, i.e. a sixty-four times reduction of the fully opened 256 millimeter square original aperture. In this example, substantial horizontal disparity is retained even in the closed position due to the horizontal separation between the small iris triangles 48, with each triangle forming its required encoded color image on the image plane.

Figure 3:
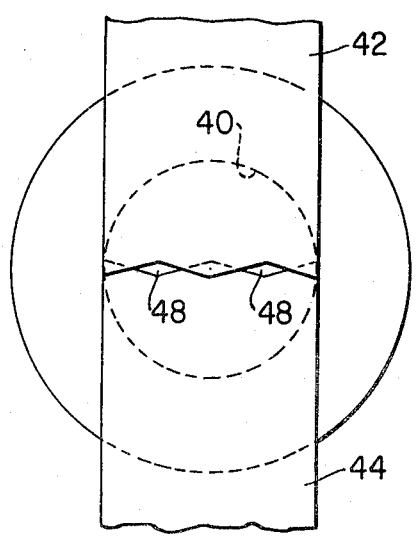
FIG. 3 shows the iris of FIG. 2 in its fully closed position.

Greater horizontal separation than that shown in FIGS. 2 and 3 is possible for greater horizontal disparity consistent with tolerable image aberration because of utilization of marginal regions of the lens. Shapes other than triangles may also be used consistent with the resolution limitations due to aperture diffraction for a selected aperture area.

Figure 8:
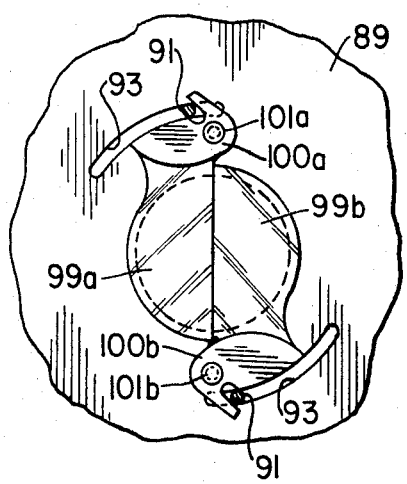
FIG. 8 is a view along line 8—8 of FIG. 7.
Figure 9:
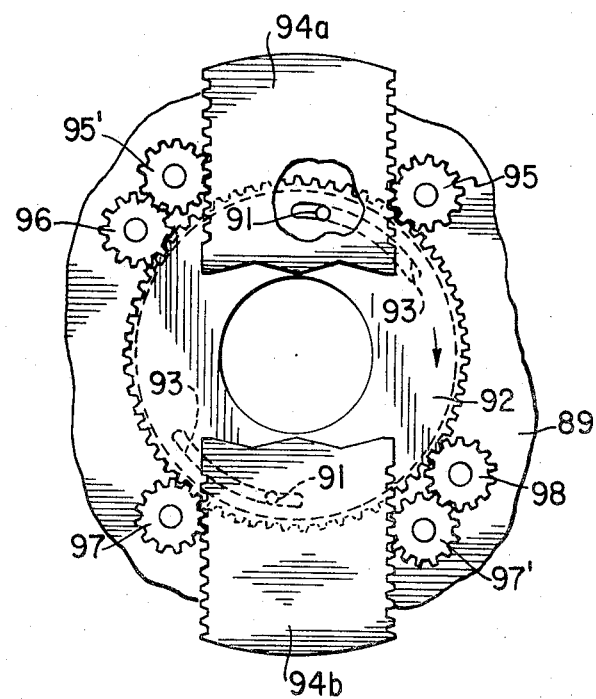
FIG. 9 is a view of the iris construction looking from the left of FIG. 7.
Figure 10:
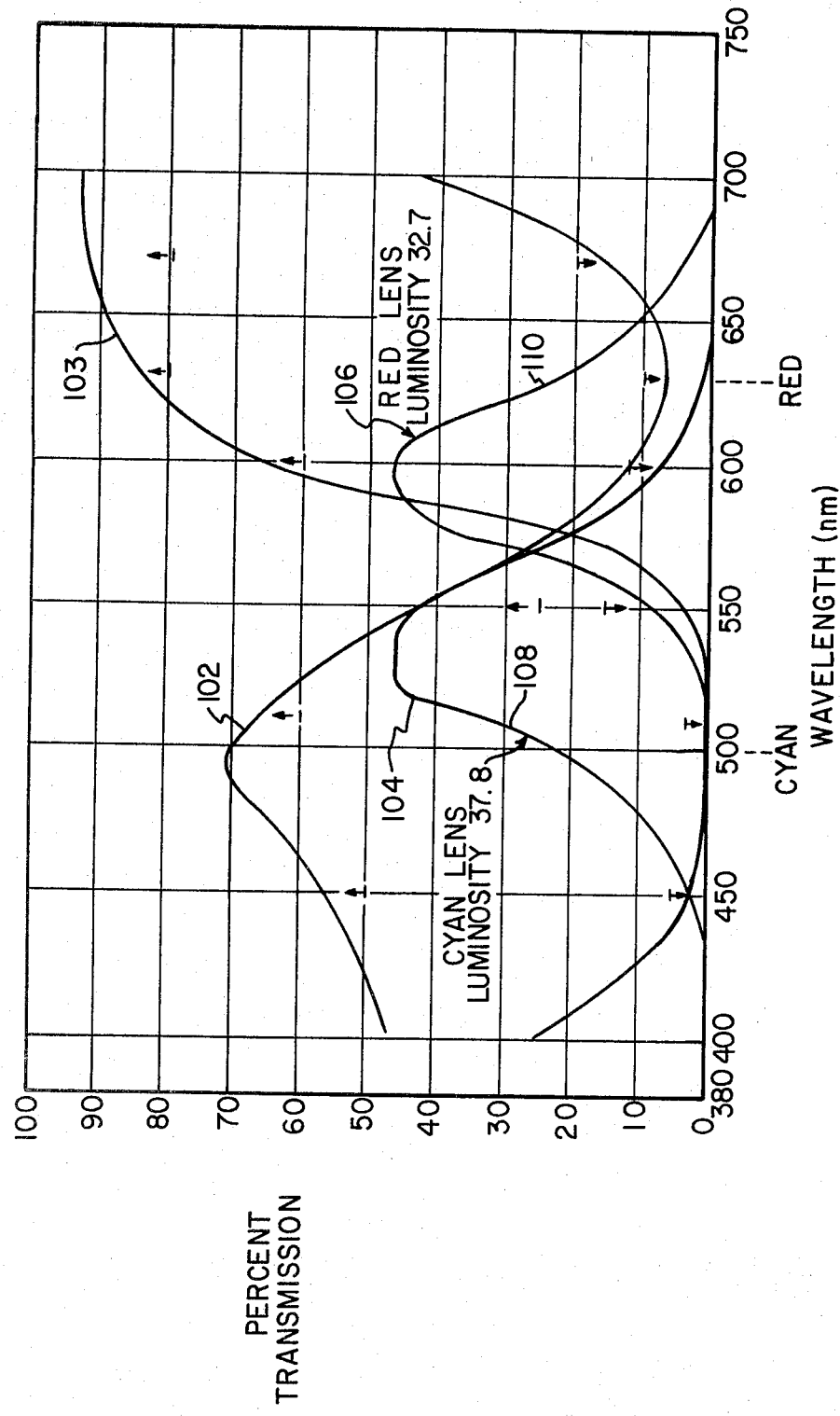
FIGS. 10 and 11 show preferred transmittance and luminosity characteristics of red-cyan and green-magenta glasses, respectively.

The use of a vertically actuated iris avoids the need to use the special filter constructions shown in FIGS. 8, 9 and 10 of Songer. Those "butterfly" constructions selectively eliminate rays travelling predominately along vertically displaced paths through the lens in order to enhance the definition of upper and lower edges; however, they also reduce filtration as the iris opens. Since the same effect (of selective elimination) is provided by the vertically actuated iris of FIG. 2, the filters used with the invention may fill essentially the entire iris opening, for example, as shown schematically in FIGS. 2 and 5 of Songer, allowing anaglyphic imaging even under restricted illuminating conditions, when the iris may be opened wide.

Figure 4:
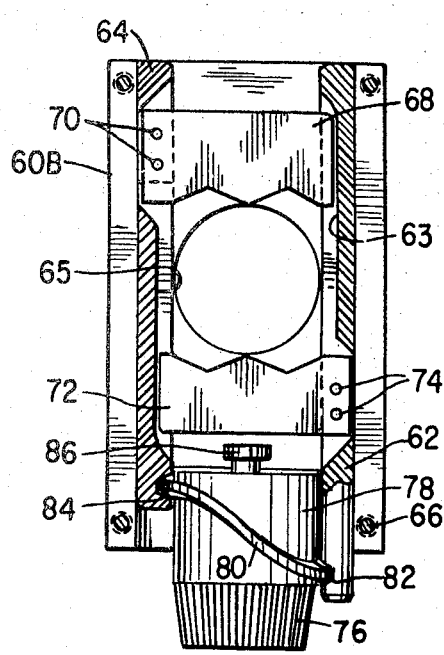
FIG. 4 is a front view, partially in section, of the construction of a module incorporating a one-dimensional iris.
Figure 5:
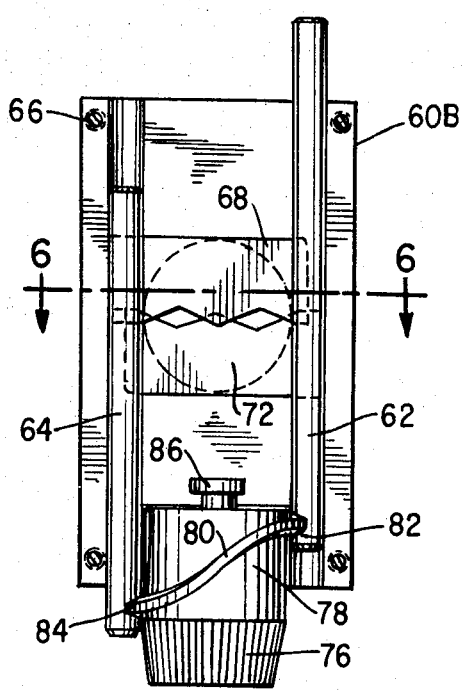
FIG. 5 is a front view of the module showing the iris in its fully closed position.
Figure 6:
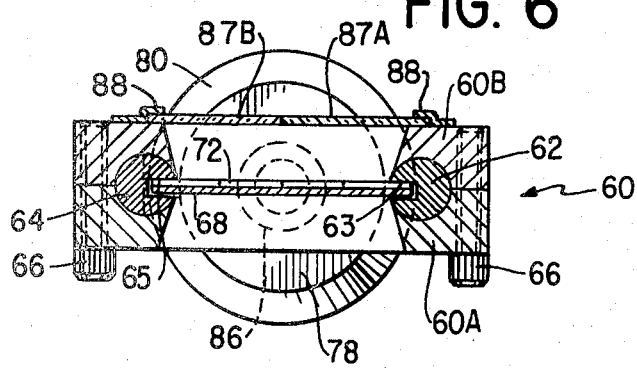
FIG. 6 is a sectional view along the lines 6—6 of FIG. 5.

FIGS. 4, 5 and 6 show the construction of a module adapted to be inserted into a camera (for example, as shown in FIG. 1) to provide the stereoscopic visual effects as described above. The specific means for maintaining the module within the camera is not shown.

The module includes a rectangular frame 60, in which two rods 62 and 64 slide vertically. The frame 60 may include half sections 60A and 60B held together by fasteners 66.

The rods 62 and 64 include elongated slots 63 and 65 shaped as shown in FIG. 6. An upper diaphragm blade 68 is secured to rod 64 within slot 65 by means of fasteners 70. Likewise, a lower diaphragm blade 72 is secured to rod 62 within slot 63 by fasteners 74.

The diaphragm blades 68 and 72 are controlled manually by a knob 76, which includes a cylindrical barrel 78 around which a helical cam 80 extends. The cam 80 cooperates with a slot 82 in rod 62 and a slot 84 in rod 64. An axle 86 extends upwardly from barrel 78 into appropriately shaped openings (not numbered) within the plates 60A and 60B to retain this manual control member. When the knob 76 is rotated, the cam 80 forces the rods 62 and 64 in opposite directions, opening or closing the diaphragm as desired. FIG. 4 shows the diaphragm blades 68 and 72 fully opened, whereas FIG. 5 shows the blades of the diaphragm as fully closed.

The filer may be of conventional construction, comprising complementary filter elements 87A and 87B held within suitable retaining slots 88 in the module so that when the module is inserted into the camera, the respective filters each cover half of the lens aperture opening.

In addition to sustaining substantially full stereoscopic separation as the iris opening is decreased, the vertical iris also improves vertical resolution. This is due to the increased vertical depth of field and the reduction of abberation in the vertical direction caused by restricting the iris in the vertical direction only and using the highest quality (vertically) central portion of the lens.

Figure 7:
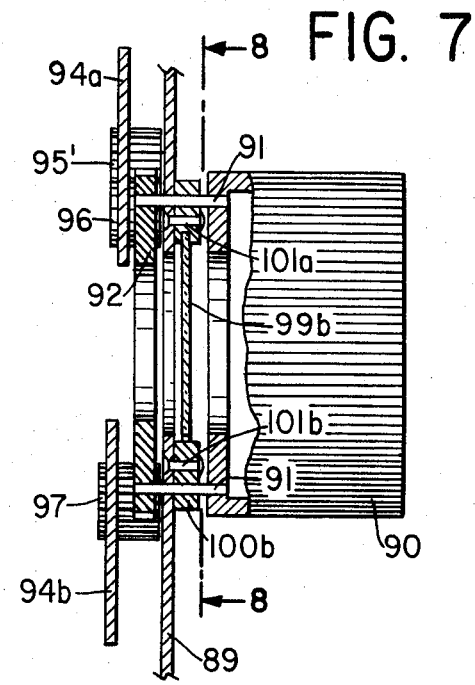
FIG. 7 is a side sectional view showing the construction of a vertical iris wherein a single member controls the iris opening and the positioning of the filters.

FIGS. 7, 8 and 9 show another embodiment of the vertical iris in which the actuator member for the iris inserts the filter elements into the aperture stop plane for anaglyph stereoscopy just prior to control of the iris.

The frame of the camera is shown at 89. A control ring 90 extends forwardly from the lens and includes two rearwardly extending actuating pins 91 which engage a large annular gear 92 through which light enters the lens system. The actuating pins 91 pass through a pair of arcuate lag slots 93 within camera frame 89 so that rotation of control ring 90 causes a corresponding rotation of the annular gear 92 for the purpose, as explained below, of actuating the iris blades.

As shown most clearly in FIG. 9, the iris blades 94a and 94b each include a toothed rack on each side. A pair of upper pinions 95 and 95' move the upper blade 94a in response to movement of gear 92. An idler gear 96 engages the annular gear 92 and pinion 95' so that pinions 95 and 95' will rotate in opposite directions in order to move the blade 94a vertically. Likewise, pinions 97 and 97' together with an idler gear 98 translate the rotation of annular gear 92 into a vertical movement of the blade 94b.

The complementary filter elements are shown at 99a and 99b. Each includes a mounting section 100a and 100b, respectively, having a slot (not numbered) which engages the actuating pin 91 extending from control ring 90 through the lag slots 93. As shown in FIG. 8, the filters are in their closed position (i.e. covering the aperture) so that as the actuating pins 91 rotate counter-clockwise (as viewed in FIG. 8) the diaphragm blades 94a and 94b are closed without affecting the filter position. However, if the control ring 90 and the actuating pins 91 are rotated in a clockwise direction from the position shown in FIG. 8, the pins 91 will exert pressure against the filter mounts 100a and 100b causing the filter mounts together with the associated filters to rotate clockwise about axles 101a and 101b to an open position (not shown) in which they are withdrawn substantially from the path of the light traversing the camera.

Thus, the control ring 90 serves to actuate both the filters and the iris blades. In the first portion of the control ring rotation, the filters 99a and 99b are rotated into the aperture stop plane. Further rotation of the control ring then moves the iris blades, as described above, to control the amount of light passing through the iris.

Color Filters

Color saturation may be deemed to be the degree of purity of a perceived color at a particular wavelength. The degree of color saturation is a factor in determining the compatibility of the image when viewed without glasses. Thus, the greater the desaturation of the taking filters, the less visible the color fringing (in the defocus blur) and hence the greater the compatibility. Of course, excessive desaturation will be accompanied by a reduction in stereo perception, requiring a balanced arrangement of color filters for optimum performance.

The taking color filters may be desaturated by introducing clear space into the filters or by desaturating the entire filter. The introduction of clear space will result in narrower and purer color fringes in the defocused portions of the image than will general desaturation.

In the Songer patent, the preferred complementary colors are cyan (sometimes referred to as blue and sometimes referred to as green) and red. Any complementary set of colors can be used and, theoretically at least, green and magenta filters have been proposed for use in anaglyph stereoscopy. Blue and yellow are also theoretically available but are deemed less attractive than the other complementary pairs.

The Songer patent discusses the characteristics of the taking and viewing filters, stating that the filters should provide "equal brightness transmission of mutually exclusive portions of the spectrum" (column 5, lines 22–25). With respect to cross talk between the filters, Songer states that it is important that there be "extremely low cross-talk between them" (column 5, lines 49 and 50) to minimize eye fatigue and confusion to the viewer. Referring specifically to the glasses, Songer states that "the amount of cross-transmission of the lenses must be kept to an absolute minimum in order to avoid confusing the viewer" (column 8, lines 44–46).

The Taking Filters

The "taking" filters are in the camera lens (photographic or electronic). Their characteristics are different from those of the viewing filters. The distinction is in terms of radiometric vs. photometric quantities for the taking and viewing filters, respectively. The taking filters are required to transfer radiant energy through the lens to the photosensitive material (photographic or electro-optic) such that a pair of spectrally separated exposures can occur in disparate portions of the photoreceptors, in accordance with the principles of single-lens stereo photography.

The spectral characteristics of each of the color-sensitized photosensitive materials (color films or television cameras) differs from a norm or standard. However, almost all instrumental color systems operate upon the tristimulus principle, whereby three selected portions of the radiant spectrum are caused to excite three individual arrays of photoreceptors (e.g. layers or photocathodes). With the familiar additive color primaries, they are blue, green and red, in sequence of increasing wavelength.

To accommodate most color photosystems and to allow subsequent processing (chemical and/or electronic) to be independent of the anaglyph system, the radiant exposure upon the photoreceptors should exhibit the same radiometric balance as in regular use (that is, in non-stereoscopic applications). In this way, the latitude provided by the imaging system and the color cues familiar to the photographer or cameramen will remain unchanged. For example, extra filtration for daylight or night photography may be implemented exactly as in conventional photography. Conversely, any alteration of the balance of spectral exposures will cause a need for corrective action, either by additional (normally unused) spectral filtration or by electronic color correction. These techniques may tend to deteriorate the colorimetric balance originally designed into the system. Excessive color correction by such superficial means can create two principal negative effects: (1) the visual color balance and/or saturation of the product may not be restored to its normal values; and (2) the colorimetry of the "fringes" which provide sensitive selection of color components in the binocular viewing system can be deteriorated, creating thereby, poorer stereo perception via excessive color crosstalk.

As indicated above, Songer requires that his taking filters provide equal brightness; in contrast, in accordance with the invention, the characteristics of the filters are selected so as to maintain substantially the same colorimetry as exists without the filters without regard to brightness considerations. This is achieved by adjusting the radiometric balance of the filters to maintain the same color balance between the integrated spectral sensitivities of the photoreceptors. Specifically, in accordance with the invention, the filter characteristics are selected as follows:

1. From input sensitivity data (i.e. sensitivity as a function of wavelength), the integrated spectral sensitivity is determined for each of the three photoreceptors in the taking system (i.e. the blue, the green and the red). This represents the area under the spectral sensitivity curves for each color receptor, as exposed through known (and accounted for) bandpass characteristics (such as lens and filter spectral transmission).

2. The ratio of the three integrated spectral sensitivities $(B_s:G_s:R_s)$ defines the parameter which controls "color balance". That is, a color imbalance will result if these proportions are materially altered.

3. By selecting filter spectral bandpass characteristics or by apportionment of areas within the filtering apertures (or both), a set of filter transmission characteristics are then established such that the wavelength-by-wavelength product of the filter transmission characteristics with the receptor sensing characteristics yields a new set of integrals with proportions $$B_{fs}:G_{fs}:R_{fs} = B_s:G_s:R_s$$

where the fs subscript denotes the filtered system and the s subscript denotes the original system. Acceptable tolerance will be about $+/-5$ to 10%.

Idealized multi-layer dielectric filters having unity transmission over all desired bandpass and zero elsewhere, are likely to approximate the desired characteristics discussed above. In practice, even with such idealized characteristics, a perfect color balance will not be attained, since in the vicinity of the sensor cross-over region, integrated transmission sensitivity factors are likely to be lower than in a non-cross-over region. For example, in a Red-Cyan system, both the $G_{fs}$ and $R_{fs}$ are likely to be lower in proportion to the $B_{fs}$ creating a "bluish" cast to the image if processed normally. To rectify this, the filter transmission in the blue need be reduced accordingly to reestablish the original proportions.

Color balancing in the taking process is particularly important when dye filters are employed, since their transmission characteristics depart significantly from ideal (as compared to the above multi-layer example), requiring careful selection and apportionment of the filter components to sustain the sensitivity ratios. Analysis and experiment has revealed that for photographic exposure on such film as Eastman 5247 (popular 35 mm motion picture film), appropriate Kodak Wratten filters are as follows:

On the "cyan" side: 60% of #38 and 40% of #59;
On the "red" side: 80% of #29 and 20% clear.

For television cameras having PbO (lead oxide) photocathodes and utilizing typical dichroic filters for color distribution to the cameras, the practical Kodak Wratten filters are:

On the "cyan" side: 70% of #38 and 30% of #57A;
On the "red" side: 85% of #26 and 15% clear.

Another factor in the taking filters is that of crosstalk. To quantify cross-talk, "primary" excitation may be defined as that which elicits the principal one of the complementary set, and "secondary" excitation as that which represents the feed-through component. Cross-talk is the ratio of the secondary excitation to the total over the wavelength region of interest and bounded by the cross-over wavelength(s) of the system. In this context, 100% cross-talk represents no filtration and zero cross-talk would be achieved by total isolation of the two spectral regions. In the taking system, the wavelength region of interest may be considered to be 400 nm to 700 nm. In the viewing filters, cross-talk may be measured over the accepted limits of photoptic luminosity (440 nm to 680 nm).

When totally isolated, (zero cross-talk), the color fringing perceived in the displayed image will be as saturated as allowed by the total system; hence, most prominent and least "compatible" (in free-viewing). In contrast to Songer's criteria for color filtration, in which no cross-talk was allowed, it is preferred that a small amount of cross-talk (e.g. about 2–10% be provided in the taking filters for increased compatibility, consistent with minimal perturbation of the retinal disparity during stereo viewing. Cross-talk is inserted in part by the clear space of the filter and in part by the gradual roll-off of the selected filter transmissions from its "primary" excitation region to the "secondary" one.

The Viewing Filters

After extensive experimentation, it has been determined that optimum benefits with regard to compatibility, image separation (stereoscopic effect) and comfort are obtained if the taking filters have the characteristics described above and the viewing lenses have a moderate amount of cross-talk (for example about 5% to 15%). Specifically, with regard to the viewing lenses, the limits of the transmittance characteristics for red-cyan and green-magenta, in accordance with the invention, are given in the following chart for key wavelengths.

| PERCENT TRANSMITTANCE LIMITS AT KEY WAVELENGTHS FOR THE DOMINANT COLORS RED-CYAN AND GREEN-MAGENTA | | | | | | |
|---|---|---|---|---|---|---|
| | Key Wavelength | | | | | |
| Dominant Color | 450nm | 510nm | 550nm | 600nm | 630nm | 670nm |
| RED | <6% | <3% | <15% | >60% | >80% | >80% |
| CYAN | >50% | >57% | 25%–42% | <12% | <10% | <20% |
| GREEN | <10% | >28% | >28% | <15% | <10% | <20% |
| MAGENTA | >60% | <30% | <10% | <50% | >60% | >80% |

FIG. 10 shows the transmittance characteristic of red-cyan glasses found to have favorable characteristics with regard to stereo perception and viewer comfort. Curve 103 is the transmittance curve for the red lens and curve 102 represents cyan.

Figure 11:
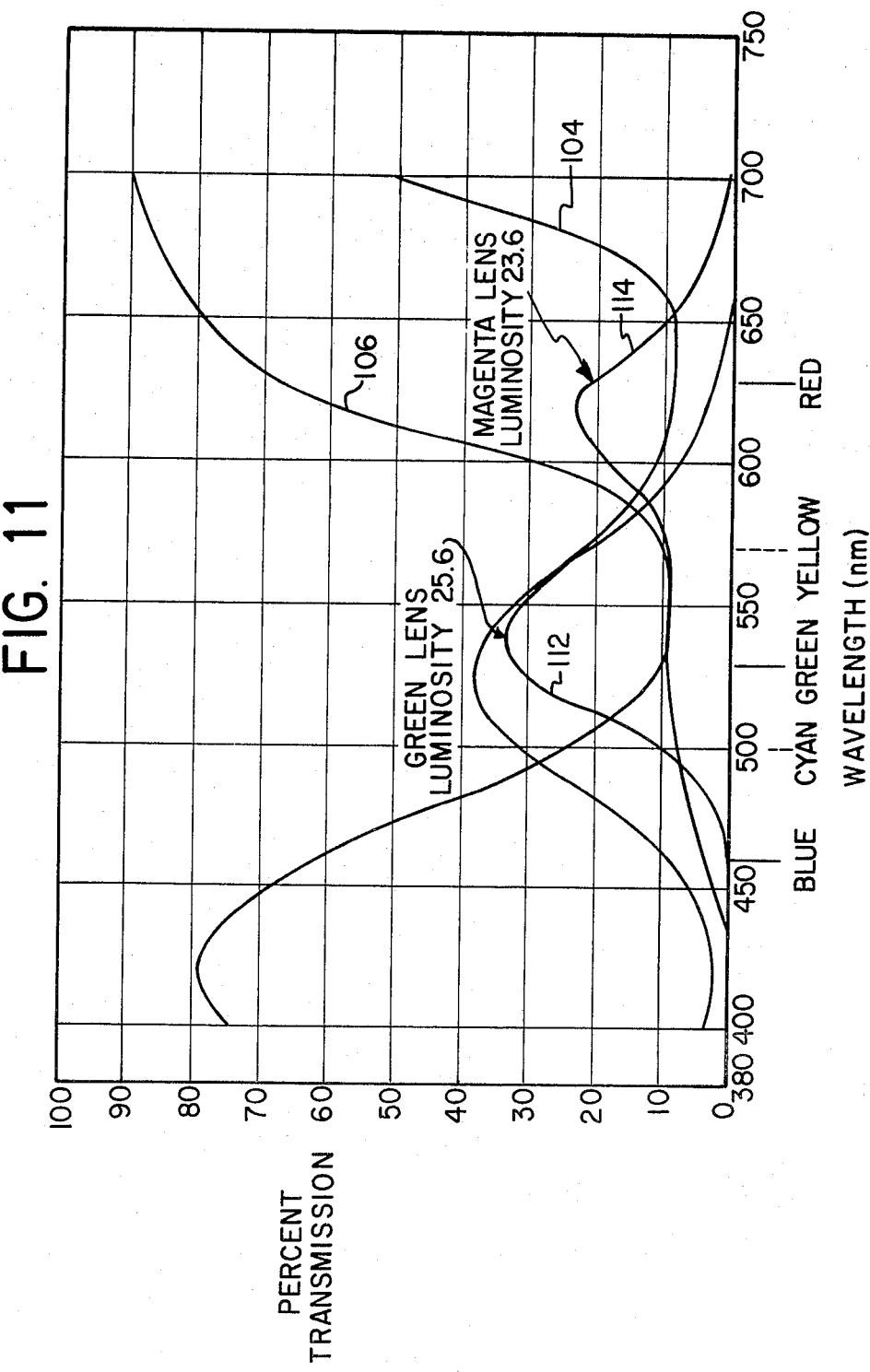

FIG. 11 shows the transmittance characteristics of preferred green-magenta lenses, curve 104 corresponding to green and curve 106 to magenta.

For the sake of viewer comfort, luminosity should be balanced in order to reduce retinal rivalry due to a differential in optical intensity. The balancing of luminosity in the two lenses may be achieved by additional control of their tinting characteristics within the above limits. The overall luminosity is the integral over the frequency range of interest (440 to 680 nm) of the product of (a) spectral luminous efficiency at wavelength $\lambda$ and (b) filter transmittance characteristics at wavelength $\lambda$. These functions should be approximately equal for each lens. It has been found that when the luminosities of the lenses are balanced to within 10%, the differential is barely perceptible. When the lenses are balanced within 25%, the differential is still tolerable.

Curves 108 and 110 (FIG. 10) represent the luminosities of the cyan and red lenses, respectively. Curves 112 and 114 (FIG. 11) represent the luminosities of the green and magenta lenses, respectively. The luminosity values represent normalized percentages of the photo-optic luminosity curve.

The Optical Relay

In single lens anaglyph stereoscopy, it is necessary to introduce the color filtration at or near the aperture stop plane of the taking lens assembly of the camera. Therefore, each lens assembly to be used must be modified by the addition of appropriate complementary color filters. This is undesirable from a practical point of view when dealing with a family of lenses and/or complex and costly lenses, for example, of the zoom type. The use of an optical relay (as disclosed in the aforesaid application Ser. No. 966,054) can avoid these problems and provide other benefits as well.

Figure 12:
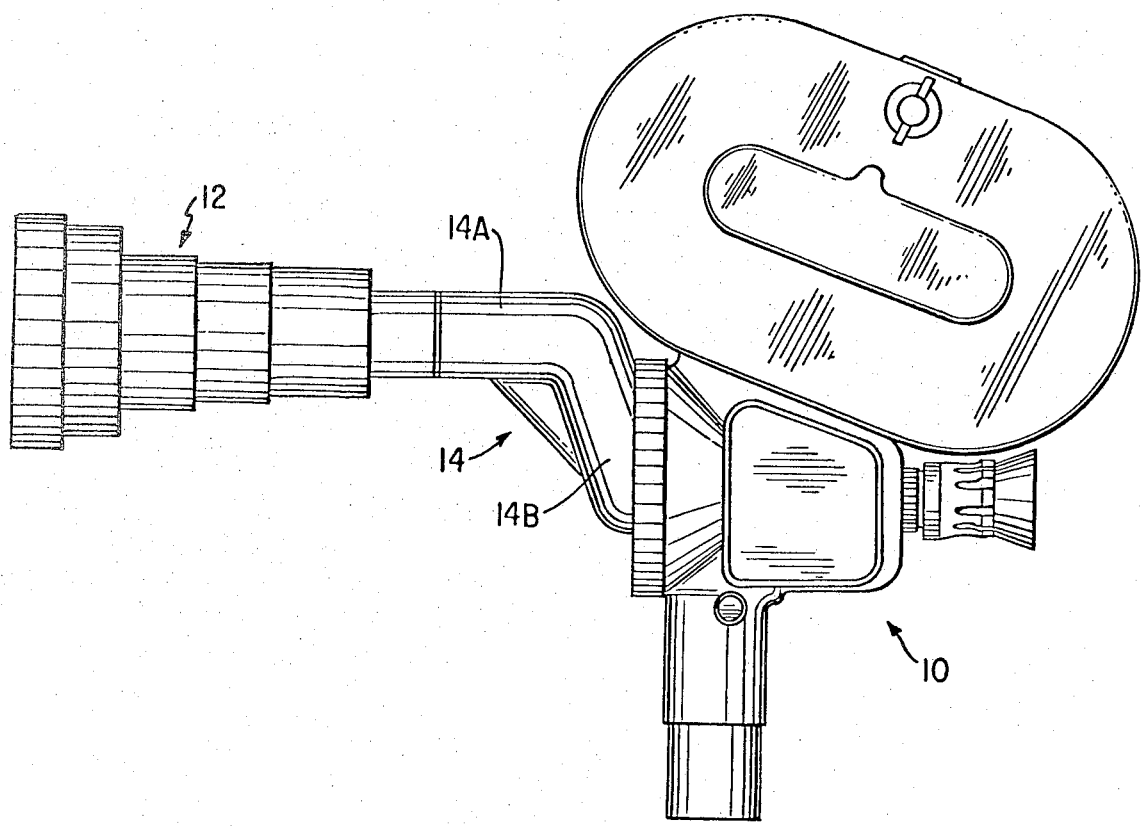
FIG. 12 is a side view showing how an optical relay would be used in conjunction with a zoom lens and motion picture camera.

FIG. 12 shows how an optical relay may be used in conjunction with a standard motion picture camera 130. In describing this optical relay and FIGS. 12, 13 and 14, the numerals of FIG. 1 will be used to identify corresponding parts.

The taking lens of the camera, shown at 12, in many cases will be expensive and complex. To adapt this camera to a single lens anaglyph stereoscopic system, it would be necessary to add the appropriate color filters to the lens 12 which would be difficult and costly. However, an optical relay 134 may be provided between the camera 130 and taking lens 12. The optical relay 134, which will include appropriate fittings (not numbered) for coupling to the standard fittings on the lens and camera, may be in the form of a periscope including a horizontal section 134A and a vertical section 134B in order to reduce the length of the required lens system. The vertical section 134B is at a slight angle from vertical so that the relay can conveniently be secured to the camera with adequate clearance between the two parts.

As explained below, the optical relay 134 functions to transfer the aperture stop within the lens 12 to a location within the relay 134 which, in this example, contains the color filters required for anaglyph stereoscopy and the vertical iris. This means that no modification or adaptation of the costly lens 12 is required to take stereoscopic pictures and also that the existing lens 12 can be replaced by other conventional lens assemblies.

Figure 13:
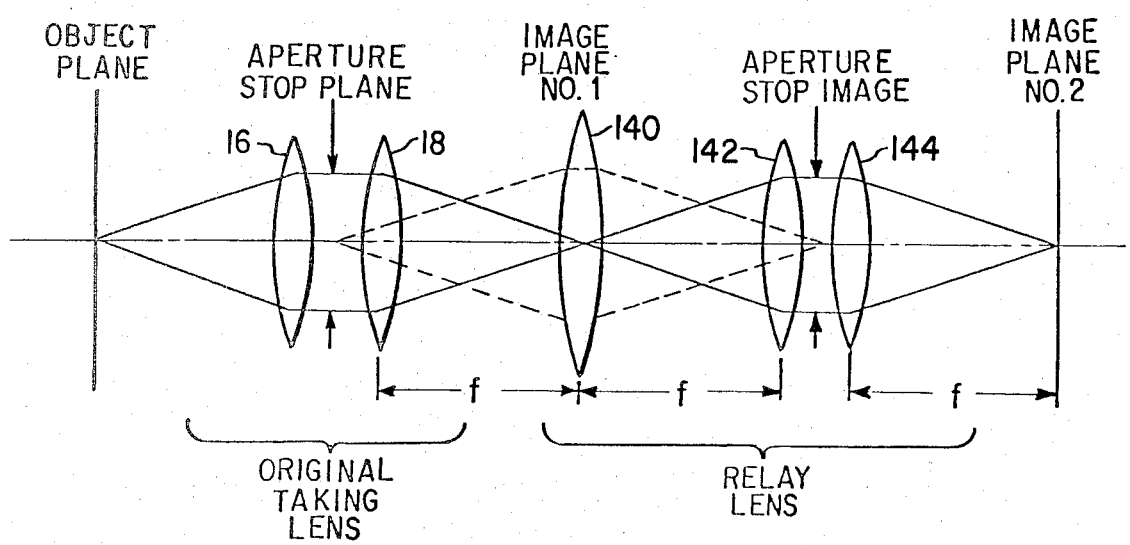
FIG. 13 shows diagrammatically the relationship of the taking lens and optical relay.

FIG. 13 shows diagrammatically the overall optical system including the original taking lens of the camera and the optical relay.

In FIG. 13, the taking lens 12 of the camera is represented schematically by front and rear lenses 16 and 18, respectively, as described above with respect to FIG. 1. The plane of focus of the lenses 16 and 18 would normally be at the photosensitive surface of the film within the camera; that surface is represented in FIG. 13 as image plane No. 1. An optical relay, represented by lens 140, 142 and 144, functions to transfer the aperture stop plane of the original lens assembly to a location exterior of that lens assembly, and also to transfer image plane No. 1 to a second image plane (identified as image plane No. 2) which, in practice, will appear at the surface of the photosensitive material within the camera.

In FIG. 13, the lens 140 may comprise a field lens positioned at image plane No. 1. Lens 140 transfers the aperture stop plane of the original lens assembly to a plane (sometimes referred to herein as the "aperture stop image plane") between the lens system 142, 144 without vignetting (i.e. truncating marginal parts of the image). The lens assemblies 16, 18 and 142, 144 are shown symmetric although they need not be symmetric.

The distance marked "f" is the (thin lens) focal length of each half of the symmetric lens 142, 144. The distance "f" (in this one-to-one imaging system) is also nominally twice the focal length of the composite (symmetric) imaging lens and of the field lens 140.

The image of the aperture stop plane of the original lens 16, 18 appears at the place marked "aperture stop image" within the symmetric lens 142, 144 of the optical relay. Therefore, the generally collimated rays emanating from each image point in image plane No. 1 appear within this aperture stop image plane so that spectral filtration may be instituted in this new region.

Figure 14:
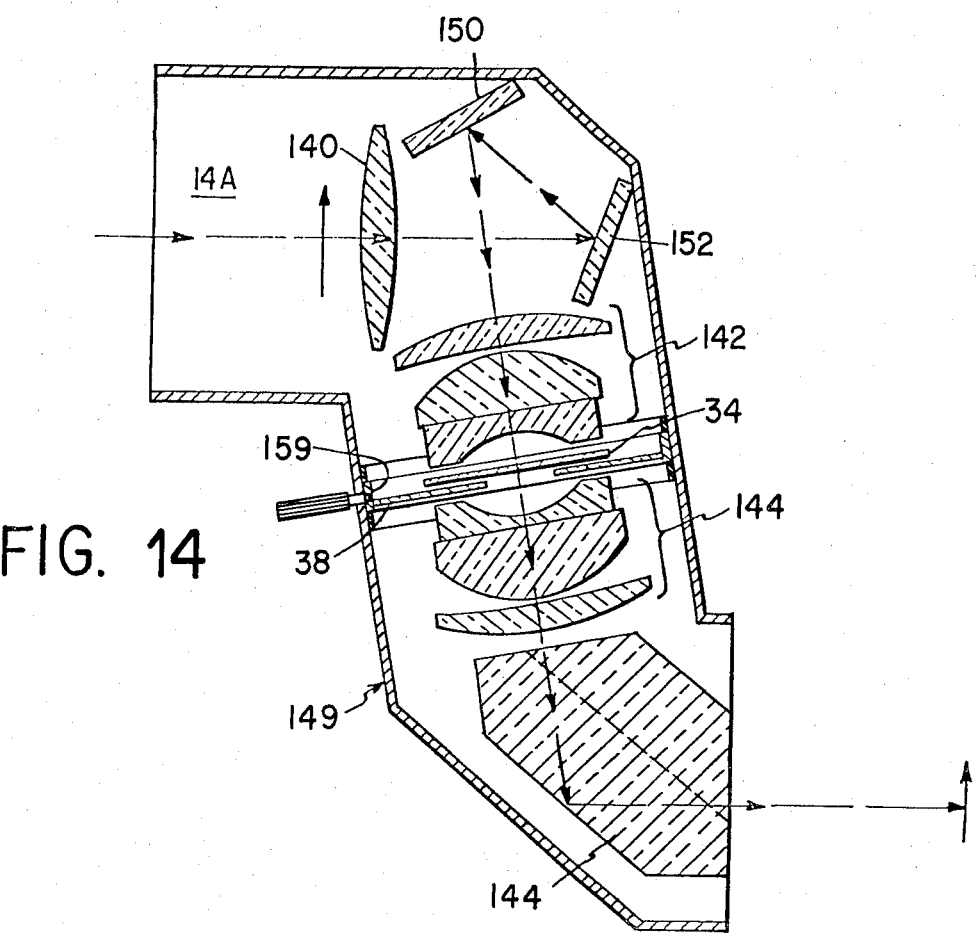
FIG. 14 shows diagrammatically a preferred embodiment of an optical relay arranged in the form of a periscope.

FIG. 14 shows in semi-diagrammatic form, a practical construction of an optical relay incorporating the optical system of FIG. 13. To the extent possible, the numerals of FIGS. 12 and 13 are used to identify corresponding elements in FIG. 14.

In a one-stage optical reimaging system, the image is inverted and reverted (i.e., reversed vertically and horizontally, respectively). This means that the optical system of FIG. 13 will cause an inverted/reverted image to be recorded on the photo-sensitive medium. It is generally desirable, particularly in the case of cameras having view-finders which are dependent on the image, to transform this inverted/reverted image to normal. In the preferred embodiment shown in FIG. 14, this is achieved by means of a mirror-prism technique as described below. The mirror and prism arrangement used to normalize the image also "folds" the physical package to reduce its physical length.

The optical relay includes a housing 149 shaped like a periscope and in which the optical elements of the relay are retained. Two penta mirrors 150 and 152 vertically invert the image from field lens 140. An amici prism 154 at the output side of the lens system 142, 144, horizontally reverts the image so that the relayed image at the output of the optical relay is the same as the original image appearing near field lens 140. The lens system 142, 144 may comprise a conventional double gauss lens as illustrated in FIG. 14 although, of course, other lenses may be used. The mirrors 150, 152 and the prism 154 are well-known optical devices. The choice (mirror or prism), in accordance with the preferred embodiment, is made primarily for optical path length adjustment. For example, glass generally increases the optical path by a factor equal to its index of refraction. Also, in the preferred embodiment, it is desirable to provide for the vertical inversion at the top of the periscope since this inversion is more readily adaptable to a vertical dimension.

At or near the aperture stop plane of the lenses 142, 144, the iris 38 and the color filters 34 are positioned. As shown diagrammatically, the iris 38 and filters 34 may be physically mounted in a module 159 which is rotatable with respect to the periscope housing 149.

The means for physically securing the various optical elements in place within periscope housing 149 are conventional and, therefore, are not illustrated in FIG. 4.

The use of an optical relay not only avoids the need to modify costly lens assemblies but may also provide important supplemental advantages, particularly insofar as anaglyph stereoscopy is concerned. Thus, stereoscopic photography requires left and right (i.e. horizontal) disparity of viewing corresponding to the viewer's left and right eyes. If Songer's camera is rotated ninety degrees, the filters will no longer be horizontally oriented and, therefore, the camera could not take stereo pictures unless the filter was correspondingly readjusted. An optical relay, according to the invention, can readily provide for rotating the filters as the camera is rotated so that left-right disparity is maintained. For this purpose, the iris 38 and filters 34 are mounted in the special module 159 which can be manually or automatically rotated as the camera is rotated. A pivoting weighted member may be coupled through a suitable linkage means so that the module maintains its correct orientation whether the camera is horizontally or vertically disposed. Of course, even where an optical relay is not used, the filters may be mounted in the camera lens so that they can be rotated to maintain horizontal disparity as the camera is rotated.

The stereoscopic effect can be varied by adjusting the amount of disparity introduced by the aperture and filters. This may be accomplished by the following methods:

1. The horizontal aperture setting can be adjusted (for example, by the round iris 28 if included in the design). This modifies the T-number by reducing overall transmittance while increasing the color saturation.
2. The peripheral filter portion may be eliminated (or peripheral transmittance increased). This modifies the T-number by increasing overall transmittance while decreasing color saturation.
3. The filters may be rotated (for example, by rotation of module 159). This retains constant T-number and saturation.
4. The filter components may be retracted from the center (or central transmittance increased). This is similar to Method 2 which is preferred in long focal length lenses to prevent excessive color fringing in the strongly defocused regions. Control of central transmittance is preferred in short focal length lenses where fringing is likely not to be excessive.

In addition to the methods described above, control over filter saturation is generally available for control of fringe intensity to achieve stereoscopy with compatibility. Any of these effects may be automated.

What is claimed is:

1. An anaglyph stereoscopic imaging device having a lens system, at least one aperture stop, left and right complementary color filters near said aperture stop for creating images having preselected color fringes in the defocus regions, wherein each of said complementary color filters essentially transmits one portion of the spectrum of visual frequencies and blocks the remaining frequencies, and an iris for restricting the amount of light passing through said aperture stop substantially in a vertical direction only, said iris comprising a pair of blades movable vertically relative to each other, with the iris opening being defined by edges of said blades.

2. An imaging device according to claim 1, wherein said edges are shaped to obstruct a portion of the horizontal subtense of the iris opening when the iris opening approaches a minimum.

3. An imaging device according to either 1 or 2, wherein each of said complementary filters is partially desaturated so that it is at least partially transmissive to said remaining frequencies.

4. An anaglyph stereoscopic imaging device according to claims 1 or 2, wherein said color filters are movable to and from said aperture stop and including a single control means for positioning said complementary color filters near said aperture stop and also actuating the blades of said iris.

5. An anaglyph stereoscopic imaging device having a lens system, photoreceptor sensing means having a pre-established ratio $(B_s:G_s:R_s)$ of spectral sensitivities for blue, green, and red, and left and right complementary color filters near the aperture stop plane of said lens system, each of said filters transmitting essentially one portion of the spectrum of visual frequencies and blocking the remaining frequencies, the characteristics of each such filter being selected such that the integrated products over the wavelengths of interest of (a) the filter transmission characteristics, and (b) the photoreceptor spectral sensitivities for blue, green and red form a ratio $(B_{fs}:G_{fs}:R_{fs})$ which is approximately the same as said pre-established ratio.

6. An imaging device according to claim 5, wherein said iris comprises a pair of blades movable vertically relative to each other, with the iris opening being defined by edges of said blades.

7. An imaging device according to claim 6, wherein said edges are shaped to obstruct a portion of the horizontal subtense of the iris opening when the iris opening approaches a minimum.

8. An imaging device according to any of claims 5, 6 or 7, wherein each of said complementary filters is partially desaturated so that it is at least partially transmissive to said remaining frequencies.

9. For use in an anaglyph stereoscopic imaging device having a lens system and photoreceptor sensing means having a preestablished ratio $(B_s:G_s:R_s)$ of spectral sensitivities for blue, green, and red:
left and right complementary color filters, each of said filters transmitting essentially one portion of the spectrum of visual frequencies and blocking the remaining frequencies, the characteristics of each such filter being selected such that the integrated products over the wavelengths of interest of (a) the filter transmission characteristics and (b) the photoreceptor spectral sensitivities for blue, green and red from a ratio $(B_{fs}:G_{fs}:R_{fs})$ which is approximately the same as said pre-established ratio.

10. An anaglyph stereoscopic imaging device according to claim 9, wherein each of said complementary filters is partially desaturated so that it is at least partially transmissive to said remaining frequencies.

11. An anaglyph stereoscopic imaging device according to any of claim 9 or 10, wherein the cross-talk between said filters is between about 2% and 10%.

12. A pair of glasses for viewing color encoded stereoscopic images, comprising cyan and red color lenses including complementary color filtering means, said lenses having approximately balanced luminosity characteristics, the cross-talk between said color filtering means being between about 5% and 15%, the transmittance of said cyan lens being greater than 57% at 510 nm and less than 10% at 630 nm, the transmittance of said red lens being less than 3% at 510 nm and greater than 80% at 630 nm.

13. A pair of glasses according to claim 12, wherein the transmittance of said cyan lens is greater than 25% at 550 nm and less than 12% at 600 nm and wherein the transmittance of said red lens is less than 15% at 550 nm and greater than 60% at 600 nm.

14. A pair of glasses according to claims 12 or 13, wherein the transmittance of said cyan lens is greater than 50% at 450 nm and less than 20% at 670 nm and wherein the transmittance of said red lens is less than 6% at 450 nm and greater than 80% at 670 nm.

15. A pair of glasses for viewing color encoded stereoscopic images, comprising green and magenta lenses including complementary color filtering means, said lenses having approximately balanced luminosity characteristics, the cross-talk between said color filtering means being between about 5% and 15%, the transmittance of said green lens being greater than 28% at 510 nm and 550 nm and less than 10% at 450 nm and 630 nm, the transmittance of said magenta lens being less than 30% at 510 nm, less than 10% at 550 nm and greater than 60% at 450 nm and 630 nm.

16. A pair of glasses according to claim 15, wherein the transmittance of said green lens is less than 15% at 660 nm and wherein the transmittance of said magenta lens is less than 50% at 600 nm.

17. A pair of glasses according to claim 15 or 16, wherein the transmittance of said green lens is less than 20% at 670 nm and the transmittance of said magenta lens is greater than 80% at 670 nm.

* * * * *